Patented July 20, 1948

2,445,642

UNITED STATES PATENT OFFICE 2,445,642

PLASTIC COMPOSITION COMPOSED OF A CELLULOSE COMPOUND AND AN INDANOL ESTER

Frank J. Soday, Baton Rouge, La., assignor to The United Gas Improvement Company, a corporation of Pennsylvania No Drawing. Application February 9, 1944, Serial No. 521,713

3 Claims. (Cl. 106—178)

This invention pertains to the use of one or more esters of indanols and methyl indanols, either alone or in combination with other plasticizing agents, as plasticizing agents for cellulose ester and cellulose ether and plastics.

An object of the invention is the provision of organic compounds comprising fluids which are essentially colorless and which are suitable for use alone or in combination with other substances as plasticizers in the formulation of lacquers, particularly those derived from one or more cellulosic plastics.

Other objects and advantages of the invention will be apparent to those skilled in the art from the following description.

Compounds in accordance with the formula

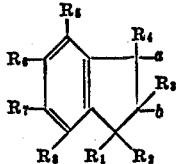

in which one of the group consisting of $a$ and $b$ is an hydroxyl group, the other being hydrogen; and $R_1$, $R_2$, $R_3$, $R_4$, $R_5$, $R_6$, $R_7$ and $R_8$ each represent hydrogen, save that any one of the said radicals $R_1$ to $R_8$ inclusive may be methyl; may be esterified with acids to give esters which are unusually stable, light in color, and possess exceptionally desirable odors.

I have discovered that esters of the indicated sort, that is esters of indanol and methyl substituted indanol are unusually desirable plasticizing agents for cellulose ester and cellulose ether plasticizing material. Such esters are produced by reaction with a carboxylic acid.

Acids which may be reacted with indanol and methyl indanols include aliphatic monobasic acids, such as formic, acetic, propionic, butyric, valeric, caproic, oenanthic, caprylic, pelargonic, capric, and similar acids having a higher number of carbon atoms; unsaturated acids, such as acrylic acid, crotonic acid, isocrotonic acid, methacrylic acid, vinylacetic acid, and the like; halogenated fatty acids, such as chloroformic acid, monochloroacetic acid, dichloroacetic acid, alpha-chloropropionic acid, and the like; hydroxy acids, such as glycollic acid, lactic acid, alpha-hydroxybutyric acid, and the like; amino acids, such as glycine, alanine, valine, leucine, and the like; dibasic acids, such as oxalic acid, malonic acid, methyl malonic acid, succinic acid, maleic acid, fumaric acid, and the like; aromatic carboxylic acids, such as benzoic acid, anthranilic acid, salicylic acid, phthalic acid, and the like; and aryl-substituted aliphatic acids, such as phenylacetic acid, hydrocinnamic acid, phenyl propionic acid, cinnamic acid, and the like.

Such esters may be regarded as having the following structural formula

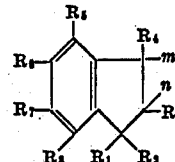

in which one of the group consisting of $m$ and $n$ is an —OOC—X group, in which X is hydrogen; alkyl, such as methyl, ethyl, propyl butyl amyl, and the like; alkenyl, such as vinyl; substituted alkyl, such as chloromethyl, hydroxymethyl, and the like; substituted alkenyl, such as methyl vinyl; aryl, such as phenyl and naphthyl; or substituted aryl, such as tolyl, xylyl, phenyl methyl, and the like; the other being hydrogen, and $R_1$ to $R_8$ has the same meaning as before.

Esters in which $R_1$ to $R_8$ are all hydrogen, or in which all are hydrogen except one, are frequently preferred.

The use of alkyl esters indanol and methyl indanols as plasticizing agents gives unusually good results in practically all cases. The acetic, propionic, butyric, and valeric acid esters of 1-indanol and 2-indanol and methyl 1-indanol and methyl 2-indanol are particularly desirable plasticizing agents for a wide variety of resinous and/or plastic materials, such as the cellulosic plastics.

Such esters may be prepared by reacting one of the group consisting of indanol and methyl indanols, or derivatives of the same containing an atom or group capable of being replaced with an ester group corresponding to the desired acid or mixture of acids, with the desired acid or anhydride, or salts or derivatives thereof.

The conversion of indene-type derivatives to indene-type alcohol esters of desired acids may be carried out in any suitable manner, and with any suitable esterification apparatus.

Any suitable esterification reagent, such as an acid, its anhydride, its salt or mixtures thereof, may be employed as desired.

For example, acetic acid or acid halides thereof may be employed for the conversion of indanols or methyl indanols to acetates, and salts of acetic acid may be used for the conversion of indanyl or methyl indanyl halides to acetates.

Illustrative of the salts of acetic acid which may be employed as esterification reagents may be mentioned sodium acetate, potassium acetate, calcium acetate, iron acetate, lead acetate and other salts.

The esterification reaction may be carried out in the presence of a solvent, such as for example, benzene, if desired.

Any suitable reaction temperature may be employed, such as for example, the boiling point of the solution.

The esterification reaction may be carried out at atmospheric, subatmospheric, or superatmospheric pressures, as desired.

The use of a system whereby any water formed by the esterification reaction can be continuously removed from the system will, in general, be found advantageous from the standpoint of the yield of ester secured, as well as from the standpoint of the considerable reduction in time necessary to complete the reaction.

One suitable method for effecting the esterification processes of the present invention comprises refluxing the derivatives with esterification reagents for a period of several hours.

For example, salts of acetic acids may be refluxed with indene-type halides to produce the corresponding indanol esters. This reaction may, if desired, be effected in the presence of acetic acid.

The indanol esters thus produced may be suitably separated from the halogen salts in the reaction mixture, for example, by filtration.

If acetic acid has been employed in the esterification reaction, it may be removed such as by distillation under reduced pressure. Any unremoved acid may then be neutralized such as with an alkaline solution.

The indanol esters obtained by the processes herein described may be isolated and purified in any desired manner.

For example, the reaction mixture may, if desired, be repeatedly extracted with any suitable solvent, such as ether or benzene, to increase the yield and purity of the esters therein.

The extracts may then be combined and dried over a drying agent such as, for example, anhydrous sodium sulfate, after which the extraction solvent employed may be removed by distillation at atmospheric pressure. The residue may then be fractionally distilled in vacuo to obtain a purified ester of the desired type.

Mixtures of indanol and methyl indanol may be esterified, if desired, to give a mixed ester. In this manner, esters having almost any desired range of volatility, and/or other characteristics may be obtained.

In a similar manner, a mixture of two or more acids, or derivatives thereof, may be reacted with indanol and methyl indanol, or derivatives, to give mixed esters possessing desired physical properties.

Similarly, a mixture of fatty acids, such as acetic and butyric acids, may be reacted with one or more of indanol and methyl indanol such as a mixture of indanol and methyl indanol.

When mixtures of such esters are obtained, they may if desired be separated into fractions containing the individual compounds by any suitable method, such as for instance by fractionation.

I have found that indanol and methyl indanol have a pronounced tendency to dehydrate even upon standing at room temperature. Consequently they should be esterified as soon as possible after formation, and precautions should be taken to avoid dehydrating conditions during esterification.

I prefer to prepare the desired esters by the reaction of an indanol halide with a metallic salt of the desired acid.

The indene and/or substituted indene used in the practice of my invention may be obtained from any desired source, although I generally prefer to employ fractions obtained upon the fractionation of light oil obtained by the pyrolysis of petroleum or of petroleum hydrocarbons, as such fractions are substantially free of coumarone and/or substituted coumarone.

In the case of indene, I prefer to use fractions boiling mainly in the range of 175 to 190° C., and more preferably 177 to 185° C.

In the case of substituted indene, I prefer to use fractions boiling mainly in the range of 190 to 220° C. Such fractions may be further subdivided, if desired, to give fractions boiling mainly in the ranges of (a) 190 to 200, (b) 200 to 210, and (c) 210 to 220° C., respectively. The unsaturated hydrocarbons present in such fractions are comprised mainly of methyl indene.

The procedure may be illustrated by the following examples.

*Example 1*

A 900 cc. portion of a light oil indene fraction having a mid boiling point of 181° C. and containing 88.4% indene was mixed with 2% methyl alcohol, cooled to 0° C., and saturated with hydrogen chloride. The reaction product thus obtained, was hydrolyzed with 1.5 liters of water and slightly more than the calculated amount of $CaCO_3$ by heating at 60° C. for 2 hours. The oily layer was separated, dried rapidly with anhydrous sodium sulfate, and fractionated at a pressure of 10 mm. of mercury, absolute, to isolate 1-indanol.

The 1-indanol obtained (B. P.=115–125° C.) then may be esterified according to the methods described previously.

*Example 2*

One liter of the indene fraction used in Example 1 was cooled to 0° C., 20 cc. of methyl alcohol was added, and hydrogen chloride was passed into the mixture until the theoretical amount had been absorbed. The product was diluted with 500 cc. of acetic acid and 10% more than the calculated amount of anhydrous potassium acetate added. The mixture was refluxed for 5 hours, after which the gelatinous precipitate of KCl was filtered off and the filtrate distilled at a pressure of 10 mm. of mercury, absolute. 1-acetoxy-indane, boiling at 110–121° C. @ 10 mm. was obtained. The ester is light in color, unusually stable, and possesses a pleasant fruity odor.

As pointed out previously, these esters are excellent plasticizers for certain organic plastic materials, which are cellulosic derivative plastics, such as cellulose esters and ethers, for example, cellulose acetate, cellulose nitrate, ethyl cellulose, benzyl cellulose, cellulose acetopropionate, cellulose acetobutyrate, and the like.

The properties of indanol and methyl indanol esters which render them particularly desirable for use as plasticizing agents for resinous and plastic materials are (1) their unusually good solubility characteristics, rendering them compatible with a wide variety of resins and plastics, (2) their chemically inert nature, resulting in the production of very stable compositions, (3) their relatively high boiling point or ranges, retarding or preventing blushing, bleeding, blooming, and the like, and insuring against premature embrittlement due to loss of solvent, (4) their colorless and color-stable properties, enabling permanent light colored or colorless compositions to be formed at will, (5) the ease with which they may be incorporated in plastic compositions, and (6) their low viscosity characteristics.

Any desired quantity of esters of the type disclosed herein may be incorporated in such resinous or plastic compositions, or mixtures thereof, due care being taken not to exceed the compatibility limit of the desired ester, or mixtures of such esters, if a clear plastic and/or coating composition or film is desired. In certain cases in which a translucent and/or opaque effect is desired, the compatibility limit of the ester, or mixture of esters, in the plastic, or mixture of plastics, may be exceeded with this end in view.

For most purposes, I find that from 5% to 50% of an ester, or mixture of esters, of the type described herein is sufficient to impart the desired degree of plasticity to the resin and/or plastic, although this quantity may be exceeded in certain cases. Excellent results may be secured in many cases in which 10% to 30% of the plasticizing agent is employed.

Esters of the type described herein also may be used in conjunction with other plasticizing agents, such as esters of phthalic acid, tetrahydrophthalic acid, 3-methyl-Δ4-tetrahydrophthalic acid, 4-methyl-Δ4-tetrahydrophthalic acid, 3,6-endomethylene-Δ4-tetrahydrophthalic acid, maleic acid, and the like; esters of sebacic acid such as dicapryl sebacate; esters of abietic acid, and rosin acid, as well as hydrogenated esters thereof; phosphoric acid esters, such as tricresyl phosphate; chlorinated diphenyls; and the like.

Other ingredients, including solvents, fillers, pigments, dyes, driers, and the like also may be incorporated in compositions of the type described, if desired.

*Example 3*

A nitrocellulose lacquer having the following composition is prepared.

| | Parts |
|---|---|
| Ester gum | 5 |
| 1-acetoxyindane | 5 |
| One half-second nitrocellulose | 10 |
| Thinner | 40 |

The thinner used had the following composition:

| | Parts |
|---|---|
| Pentacetate | 20 |
| Tertiary amyl alcohol | 10 |
| Isopropyl acetate | 13 |
| Absolute ethyl alcohol | 3 |
| Toluene | 34 |
| Troluoil | 20 |

The lacquer is clear and light amber in color. A portion of it is flowed on the surface of a tin panel and permitted to dry for a period of 48 hours. The coating film obtained is clear and possessed good elastic properties.

*Example 4*

A nitrocellulose lacquer is prepared according to the following formula.

| | Parts |
|---|---|
| Nitrocellulose | 5 |
| Rosin ester | 2½ |
| 1-acetoxyindane | 2½ |
| Thinner | 40 |

The thinner had the following composition:

| | Parts |
|---|---|
| Propyl acetate | 15 |
| Amyl acetate | 18 |
| Mixed amyl alcohols | 10 |
| Ethyl alcohol | 4 |
| Toluene | 33 |
| Petroleum naphtha | 20 |

The lacquer is clear and had a very slight amber color. It is flowed on the surface of a freshly cleaned tin panel and permitted to dry for a period of 48 hours. A clear, adherent coating is obtained.

*Example 5*

An ethyl cellulose lacquer is prepared according to the following formula.

| | Parts |
|---|---|
| Ethyl cellulose | 10 |
| 1-acetoxyindane | 5 |
| Ester gum | 5 |
| Thinner | 80 |

The used thinner had the following composition:

| | Parts |
|---|---|
| Isopropyl acetate | 15 |
| Absolute ethyl alcohol | 3 |
| Amyl acetate | 18 |
| Tertiary amyl alcohol | 10 |
| Toluene | 40 |
| Troluol | 14 |

The lacquer is clear and had a very light amber color. It is brushed on the surface of a tin panel and permitted to dry for a period of 48 hours, whereupon a clear, adherent coating film is obtained.

*Example 6*

A cellulose acetate lacquer is prepared by mixing 7 parts of the following base formula.

| | Parts |
|---|---|
| 1-acetoxyindane | 35 |
| Cellulose acetate | 65 | with 93 parts of a thinner having the following composition:

| | Parts |
|---|---|
| Acetone | 50 |
| Cellosolve | 20 |
| Toluene | 15 |
| Pentacetate | 15 |

The lacquer obtained is fairly clear and quite colorless. It is flowed out on the surface of a tin panel and permitted to dry for a period of 48 hours, whereupon a fairly adherent coating film was obtained.

I claim:

1. A plastic composition which consists of a plasticizable organic material selected from the group consisting of cellulose esters and cellulose ethers and a minor amount of a compound selected from the group consisting of carboxylic acid esters of indanol and carboxylic acid esters of a methyl indanol sufficient to plasticize said organic material.

2. A plastic composition which consists of a plasticizable organic material selected from the group consisting of cellulose esters and cellulose ethers and a minor amount of a carboxylic acid ester of indanol sufficient to plasticize said organic material.

3. A plastic composition which consists of a plasticizable organic material selected from the group consisting of cellulose esters and cellulose ethers and a minor amount of a carboxylic acid ester of a methyl indanol sufficient to plasticize said organic material.

FRANK J. SODAY.

REFERENCES CITED

The following references are of record in the file of this patent:

UNITED STATES PATENTS

| Number | Name | Date |
|---|---|---|
| 1,975,697 | Muckenfuss | Oct. 2, 1934 |
| 2,293,775 | Soday | Aug. 25, 1942 |
| 2,378,447 | Soday | June 19, 1945 |
| 2,384,855 | Soday | Sept. 18, 1945 |

FOREIGN PATENTS

| Number | Country | Date |
|---|---|---|
| 431,565 | Great Britain | July 8, 1935 |